(12) United States Patent
Vainio et al.

(10) Patent No.: US 6,644,952 B1
(45) Date of Patent: Nov. 11, 2003

(54) ROTATING EXTRUDER NOZZLE STRUCTURE

(75) Inventors: Tommi Vainio, Vantaa (FI); Jukka Hillberg, Jarvenpaa (FI); Mikko Kostiainen, Vantaa (FI)

(73) Assignee: Nextrom Holding S.A., Ecublens-Lausanne (CH)

( * ) Notice: Subject to any disclaimer, the term of this patent is extended or adjusted under 35 U.S.C. 154(b) by 7 days.

(21) Appl. No.: 09/959,990

(22) PCT Filed: Jun. 7, 2000

(86) PCT No.: PCT/FI00/00508

§ 371 (c)(1),
(2), (4) Date: Jan. 7, 2002

(87) PCT Pub. No.: WO00/76743

PCT Pub. Date: Dec. 21, 2000

(30) Foreign Application Priority Data

Jun. 9, 1999 (FI) .................................................. 991319

(51) Int. Cl.[7] .............................................. B29C 47/24
(52) U.S. Cl. .................... 425/190; 425/381; 425/382.3; 425/466
(58) Field of Search .............................. 425/190, 192 R, 425/381, 382.3, 465, 466

(56) References Cited

U.S. PATENT DOCUMENTS

| | | | |
|---|---|---|---|
| 4,548,567 A | * 10/1985 | Missout | 425/381 |
| 4,806,086 A | 2/1989 | Bloch et al. | 425/461 |
| 6,158,999 A | * 12/2000 | Hartman et al. | 425/192 R |
| 6,447,279 B1 | * 9/2002 | Guillemette et al. | 425/382.3 |

FOREIGN PATENT DOCUMENTS

GB  1 573 196  8/1980

* cited by examiner

Primary Examiner—James P. Mackey
Assistant Examiner—Joseph Leyson
(74) Attorney, Agent, or Firm—Oliff & Berridge, PLC

(57) ABSTRACT

The invention relates to a rotating nozzle structure of an extruder which comprises a rotatable nozzle, a die, which rests against the extruder frame and which comprises an annular front surface on the nozzle side, and a sealing plate, which is arranged between the front surface of the die and the nozzle and pressed tightly against the sealing surface of the nozzle to seal the nozzle with respect to the die. According to the invention, the die is arranged to slide in the axial direction with respect to the extruder frame and comprises a flow channel, which is under pressure of the material to be extruded and tapers conically towards the nozzle, and that the ratio of the area ($A_{tiv}$) of the die's annular front surface to the area ($A_{proj}$) of the projection surface of the flow channel's conical section is between 0.1 and 10.

8 Claims, 1 Drawing Sheet

ROTATING EXTRUDER NOZZLE STRUCTURE

BACKGROUND OF THE INVENTION

The invention relates to a rotating nozzle structure of an extruder which comprises a rotatable nozzle, a die, which rests against the extruder frame and comprises an annular front surface on the nozzle side, and a sealing plate, which is arranged between the front surface of the die and the nozzle and pressed tightly against the sealing surface of the nozzle to seal the nozzle with respect to the die.

The rotating nozzle structure described above can be used e.g. for extruding a groove element used as the core element in optical cables. When such a groove element is extruded, part of the nozzle structure has to be rotatable so that the grooves of the groove element can be provided with the desired helical twist or reverse twist. Such helical or reverse twist is necessary to avoid subjecting optical fibres, fibre ribbons or the like to excessive tension in a finished cable when the cable is bent.

In such a rotating nozzle structure problems are caused by the sealing between the fixed part and the rotating part of the nozzle structure. On the one hand, sealing pressure acts on the sealing surface between the rotating part and the fixed part and it has to be sufficient to provide sealing. On the other hand, this joint is rotatable, in which case the sealing conditions on the sealing surface vary considerably depending on the speed of rotation. To be more specific, the pv value (surface pressure x sliding speed) of the sealing surface has to be kept within acceptable limits with respect to the useful life of the sealing surface, but it is also necessary to provide sufficient sealing strength. At high temperatures in particular, e.g. when the above-mentioned groove element is extruded, it is very difficult to provide a sufficiently durable and tight rotating sealing surface. No matter how hard sealing surfaces, e.g. diamond-coated surfaces, are used, the sealing surfaces break and wear out already after a few minutes, causing seizure of the rotating joint surface. Naturally the sealing pressure used has a considerable influence on the function of the sealing. Thus the sealing pressure should be adjustable so as to guarantee appropriate sealing in the given process conditions.

BRIEF DESCRIPTION OF THE INVENTION

The object of the present invention is to provide a rotating nozzle structure of an extruder in which the structure of the rotating joint guarantees sufficient tightness but simultaneously allows adequately long continuous use. This is achieved with a rotating nozzle structure which is characterized in that the die is arranged to slide in the axial direction with respect to the extruder frame and comprises a flow channel which is under pressure of the material to be extruded and tapers conically towards the nozzle, and that the ratio of the area of the projection surface of the die's annular surface to the area of the projection surface of the flow channel's conical section is between 0.1 ... 10. According to the invention, the sealing pressure is produced by means of the pressure of the material to be extruded, and thus the sealing pressure is proportional to this pressure. The sealing pressure is directed onto the sealing surface by providing the extrusion channel with a conically tapering shape. By dimensioning the projection surface of the conically tapering channel appropriately with respect to the area of the sealing surface, we achieve desired sealing, but avoid too high sealing pressures.

The sealing plate, which is placed between the die and the rotating nozzle and is the wearing part of the rotating joint, is preferably made of a porous material impregnated with a lubricant, such as heat-resistant oligomer or polymer with a suitable viscosity. In a preferred embodiment the sealing plate is made of a sintered bronze-based material. This solution provides a structure which will function even when the maximal rotational speed of the nozzle is 500 rounds per minute and the maximal pressure to be sealed 300 bar.

By dimensioning the sealing pressure as described above and by using a suitably lubricated sealing plate to decrease friction on the sealing surface, we achieve the object of the invention, i.e. good sealing and a sufficiently durable structure, which enables use of the rotating nozzle structure for over 24 hours without service. In practice the service means change of the sealing plate. Naturally the die is made of a hard enough material so that on the sealing surface wear is concentrated on the sealing plate, which is easy and quick to change and is a relatively inexpensive component.

BRIEF DESCRIPTION OF THE DRAWINGS

In the following the rotating nozzle structure of an extruder will be described in greater detail with reference to the attached drawing, in which.

DETAILED DESCRIPTION OF THE INVENTION

Figure 1:
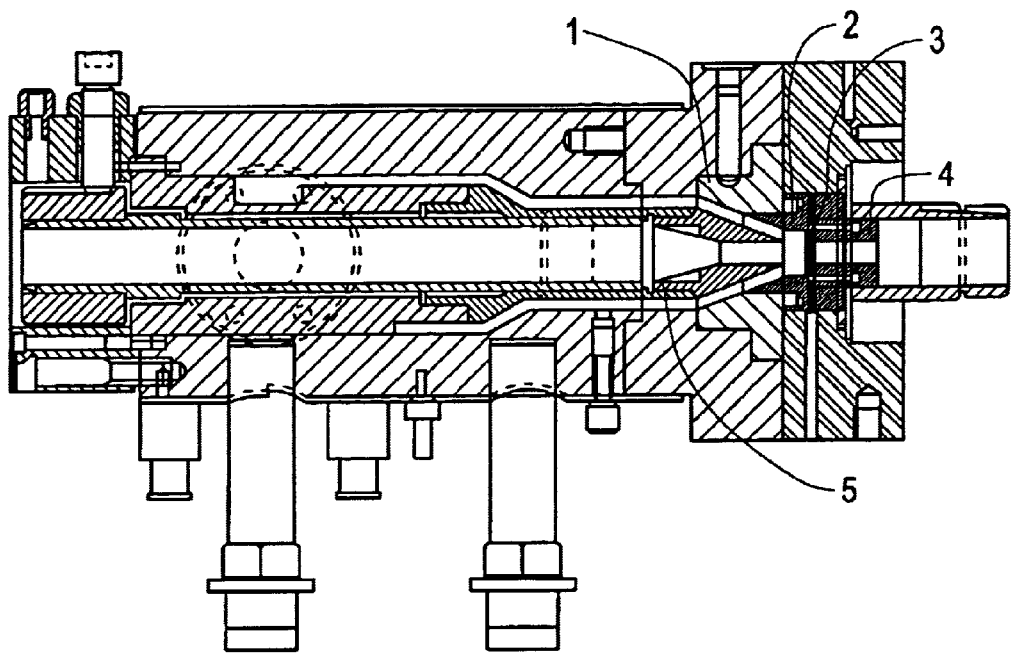
FIG. 1 is a cross-sectional view of an extruder provided with a preferred embodiment of the nozzle structure according to the invention.

FIG. 1 is a cross-sectional view of an extruder provided with a preferred embodiment of the nozzle structure according to the invention. The structure of the extruder itself is conventional in the field, for which reason it will not be described in greater detail here. The components that will be dealt with more closely are provided with reference numerals 1 to 5 in FIG. 1. Reference numeral 1 represents a die adapter which is part of the extruder frame and in which the die 2 of the rotating nozzle structure is mounted. The die is arranged to move axially with respect to the die adapter 1 so that the die can move towards the rotating nozzle due to the influence of the process pressure, i.e. to the right in FIG. 1. The rotating nozzle is provided with reference numeral 4, and the sealing plate that seals the rotating joint between the rotating nozzle and the die 2 is provided with reference numeral 3. The material to be extruded which generates the sealing pressure is fed into the nozzle structure through a flow channel 5.

Figure 2:
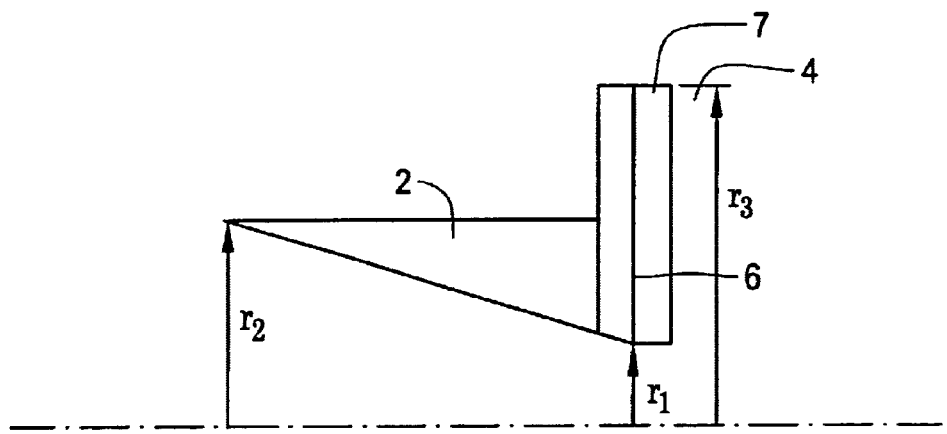
FIG. 2 is a schematic view of the nozzle structure according to the invention.
Figure 2:
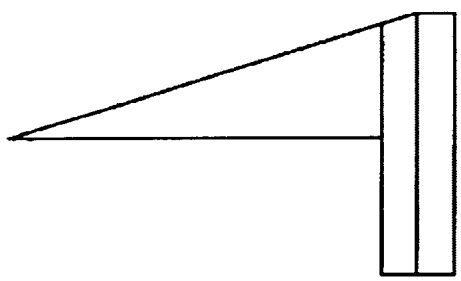

An essential feature of the invention is that the die 2 of the nozzle structure is provided with a conical surface, in which case the force directed to the projection surface perpendicular to the process direction provides sufficient sealing strength on the sealing surfaces. In the schematic view of FIG. 2 this perpendicular process surface is represented by an annular surface 6 the inner radius of which is $r_1$ and the outer radius $r_2$. The area $A_{proj}$ of this annular surface is obtained from the following formula $\pi r_2^2 - \pi r_1^2 = \pi(r_2^2 - r_1^2)$. In FIG. 2 the surface between the die 2 and a sealing plate 7 is the sealing surface. The inner radius of this annular surface is $r_1$ and the outer radius $r_3$. Thus the area $A_{tiiv}$ of this sealing surface is $\pi(r_3^2 - r_1^2)$. In the rotating nozzle structure of the invention it is essential to dimension the components so that the ratio $A_{tiiv}/A_{proj}$ is suitable, considering the pv value and the lowest sealing strength that makes the construction tight. It has been noted that the ratio of the areas should be in the range of 0.1 . . . 10. These limits are obtained from the pv tests of the sealing materials and from the lowest process pressure which provides a tight construction.

In practice, the rotating nozzle structure of the invention is intended for use in the following conditions: the operating temperature (normal) 160 to 190° C. and the limits of the operating temperature 120 to 250° C., the pressure to be sealed 1 to 300 bar and the maximal rotational speed of the rotating part 500 rounds per minute. The structure according to the invention and a suitable sealing plate enable continuous operation for over 24 hours without service.

The sealing plate 3 is also a significant part in the function of the rotating nozzle structure according to the invention. It should enable sufficiently low friction on the sealing surface. It has been found out that it is advantageous to use as the sliding pair of the die 2 a sealing plate made of a porous/sintered bronze-based material impregnated with a lubricant, which endures the process conditions, to decrease friction on the sealing surface. The lubricant is preferably heat-resistant oligomer or polymer with a suitable viscosity.

A practical solution in which the ratio $A_{tii}/A_{proj}$ will be in the defined area is e.g. a structure where the inner radius $r_1$ of the front surface of the die is 8.00 mm, the outer radius $r_2$ of the die 8.87 mm, and the outer radius $r_3$ of the front surface of the die 10.00 mm. With this dimensioning the ratio $A_{tii}/A_{proj}$ is 2.44. If the radii $r_1$ to $r_3$ are dimensioned so that the ratio of the surface areas does not fall within the recommended range, the sliding surface cannot resist the wear directed to it long enough or the joint leaks. If the sealing surface is too large with respect to the projection surface of the conical channel, the sealing pressure will be too low and a tight joint cannot be provided. In that case the value of the ratio of the areas is over 10. An example of leaking structures is a construction where $r_1$ is 15.00 mm, $r_2$ 19.66 mm and $r_3$ 50 mm, and thus the ratio $A_{tii}/A_{proj}$ is 14.07. If, on the other hand, the projection surface is too large, it generates too high a pressure on the sealing surface, which results in considerable wear of the sealing surface and thus to premature breaking of the sealing plate. In this case the ratio of the areas is below 0.1. An example of such a structural solution is a construction where $r_1$ is 20.00 mm, $r_2$ 37.32 mm and $r_3$ 22.00, the ratio $A_{tii}/A_{proj}$ being 0.08.

The rotating nozzle structure of an extruder according to the invention has been described above only by means of one preferred embodiment, and it is to be understood that its structure can be modified in various ways without deviating from the inventive concept and the scope of protection defined in the appended claims. According to the inventive concept, generation of the sealing pressure by the process pressure is enabled by dimensioning the projection surface under the process pressure of the extrusion channel appropriately with respect to the sealing surface and by using a sealing plate which guarantees low enough friction on the sealing surface.

What is claimed is:

1. A rotating nozzle structure of an extruder, comprising:
   a rotatable nozzle,
   a die, which rests against the extruder frame and which comprises an annular front surface on the nozzle side; and
   a sealing plate, which is arranged between the front surface of the die and the nozzle and pressed tightly against the sealing surface of the nozzle to seal the nozzle with respect to the die, wherein the die is arranged to slide in the axial direction with respect to the extruder frame and comprises a flow channel, which is under pressure of the material to be extruded and tapers conically towards the nozzle, and the ratio of the area of the die's annular front surface to the area of the projection surface of the flow channel's conical section is between 0.1. . . and 10.

2. A nozzle structure according to claim 1, wherein the sealing plate is made of a porous material impregnated with a lubricant.

3. A nozzle structure according to claim 2, wherein the sealing plate is made of a sintered bronze-based material.

4. A nozzle structure according to claim 1, wherein the maximal rotational speed of the rotatable nozzle is 500 rounds per minute and the maximal pressure to be sealed is 300 bar.

5. A nozzle structure according to claim 2, wherein the maximal rotational speed of the rotatable nozzle is 500 rounds per minute and the maximal pressure to be sealed is 300 bar.

6. A nozzle structure according to claim 3, wherein the maximal rotational speed of the rotatable nozzle is 500 rounds per minute and the maximal pressure to be sealed is 300 bar.

7. A nozzle structure according to claim 2, wherein the lubricant is a heat resistant oligomer.

8. A nozzle structure according to claim 2, wherein the lubricant is a polymer.

* * * * *